United States Patent
Wey et al.

(10) Patent No.: US 11,917,390 B2
(45) Date of Patent: Feb. 27, 2024

(54) ELECTRONIC DEVICE AND CONTROL METHOD THEREOF

(71) Applicant: SAMSUNG ELECTRONICS CO., LTD., Suwon-si (KR)

(72) Inventors: Hoseok Wey, Suwon-si (KR); Shukjae Choi, Gwacheon-si (KR); Inwoo Hwang, Suwon-si (KR); Sunmin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 17/665,060

(22) Filed: Feb. 4, 2022

(65) Prior Publication Data

US 2022/0159398 A1    May 19, 2022

Related U.S. Application Data

(63) Continuation of application No. PCT/KR2021/016635, filed on Nov. 15, 2021.

(30) Foreign Application Priority Data

Nov. 16, 2020 (KR) .................. 10-2020-0153109

(51) Int. Cl.
*H04S 7/00* (2006.01)
*H04R 1/02* (2006.01)
(Continued)

(52) U.S. Cl.
CPC ............ *H04S 7/301* (2013.01); *H04R 1/028* (2013.01); *H04R 1/08* (2013.01); *H04R 29/001* (2013.01);
(Continued)

(58) Field of Classification Search
None
See application file for complete search history.

(56) References Cited

U.S. PATENT DOCUMENTS 8,571,855 B2 * 10/2013 Christoph ................ H03G 3/32
704/226
9,769,580 B2    9/2017 Rabinowitz et al.
(Continued)

FOREIGN PATENT DOCUMENTS

KR    10-2008-0107087    12/2008
KR    10-2010-0024552    3/2010
(Continued)

OTHER PUBLICATIONS

Search Report and Written Opinion dated Mar. 3, 2022 in counterpart International Patent Application No. PCT/KR2021/016635.

*Primary Examiner* — Kenny H Truong
(74) *Attorney, Agent, or Firm* — NIXON & VANDERHYE P.C.

(57) ABSTRACT

Disclosed is an electronic device. The electronic device includes: an audio output device comprising circuitry configured to output a sound; a microphone; and a processor configured to control, based on a content being selected, the audio output device to output an audio signal corresponding to the content using a sound compensation value, wherein the processor is configured to: extract, based on a sound corresponding to the content being output from the audio output device and input to the microphone, characteristic information from the sound input to the microphone, calculate a sound compensation value based on the extracted characteristic information, and update the sound compensation value with the calculated sound compensation value.

13 Claims, 11 Drawing Sheets

(51) Int. Cl.
  *H04R 1/08*   (2006.01)
  *H04R 29/00*  (2006.01)
(52) U.S. Cl.
  CPC ...... *H04R 2499/15* (2013.01); *H04S 2400/15* (2013.01)

(56) References Cited

U.S. PATENT DOCUMENTS

| | | |
|---|---|---|
| 9,819,321 B2 | 11/2017 | Ko et al. |
| 10,051,393 B2 | 8/2018 | Rabinowitz et al. |
| 10,177,728 B2 | 1/2019 | Son et al. |
| 2003/0064746 A1 | 4/2003 | Rader et al. |
| 2011/0235840 A1 | 9/2011 | Mels et al. |
| 2015/0244337 A1 | 8/2015 | Ko et al. |
| 2017/0330071 A1 | 11/2017 | Roblek et al. |
| 2019/0103848 A1 | 4/2019 | Shaya et al. |
| 2019/0124461 A1 | 4/2019 | Christoph |
| 2020/0249346 A1 | 8/2020 | Im et al. |
| 2021/0337340 A1 | 10/2021 | Wey et al. |
| 2022/0312143 A1 | 9/2022 | Nakagawa et al. |
| 2022/0345841 A1* | 10/2022 | Reilly .................... H04S 7/305 |

FOREIGN PATENT DOCUMENTS

| | | |
|---|---|---|
| KR | 10-2015-0098809 | 8/2015 |
| KR | 10-2015-0111118 | 10/2015 |
| KR | 10-2015-01153002 | 10/2015 |
| KR | 10-2016-0011490 | 2/2016 |
| KR | 10-1764274 | 8/2017 |
| KR | 10-2018-0019951 | 2/2018 |
| KR | 10-2019-0023302 | 3/2019 |
| KR | 10-2020-0021854 | 3/2020 |
| KR | 10-2020-0078184 | 7/2020 |
| KR | 10-2021-0138006 | 11/2021 |

* cited by examiner

ELECTRONIC DEVICE AND CONTROL METHOD THEREOF

CROSS-REFERENCE TO RELATED APPLICATIONS

This application is a continuation of International Application No. PCT/KR2021/016635, filed on Nov. 15, 2021, which is based on and claims priority to Korean Patent Application No. 10-2020-0153109, filed on Nov. 16, 2020, in the Korean Intellectual Property Office, the disclosures of which are incorporated by reference herein in their entireties.

BACKGROUND

1. Field

The disclosure relates to an electronic device and a control method thereof, and for example, to an electronic device that compensates a sound output from an audio output device according to a spatial characteristic of a space where the electronic device including the audio output device is arranged, and a control method thereof.

2. Description of Related Art

In accordance with the development of electronic technology, various types of electronic devices have been developed and spread. Particularly, a display device used in various places such as households, offices and public places has been continuously developed in recent few years. Further, as the display device continuously flattens and is slimmed down, the degree of freedom in installation position of the display device has increased.

However, an influence on a sound output from the display device is different depending on a characteristic of a space where the display device is installed. Therefore, there is a need to perform sound compensation according to each characteristic of the space.

Further, sound compensation optimized for each indoor installation condition need to be performed because a booming phenomenon that a specific sound may be indistinct due to an unnecessarily large volume in a low frequency band or a phenomenon that clearness of a sound excessively deteriorates due to objects around a sound source may occur depending on the indoor installation condition of the display device.

Meanwhile, according to the related art, the user has been inconvenienced because the user needs to perform a specific compensation operation for sound compensation.

SUMMARY

Embodiments of the disclosure provide an electronic device that automatically compensates a sound according to a characteristic of a space where the electronic device is arranged without a manual operation of a user, the sound being output based on a content being played, and a control method thereof.

According to an example embodiment of the disclosure, an electronic device includes: an audio output device including circuitry configured to output a sound; a microphone; and a processor configured to control, once a content is selected, the audio output device to output an audio signal corresponding to the content using a sound compensation value, in which the processor is configured to: extract, based on a sound corresponding to the content being output from the audio output device and input to the microphone, characteristic information from the sound input to the microphone, calculate a sound compensation value based on the extracted characteristic information, and update the sound compensation value with the calculated sound compensation value.

The electronic device may further include a memory configured to store a plurality of space information and characteristic information of each of the plurality of space information, wherein the processor is configured to: select one of the plurality of space information using the extracted characteristic information and the stored characteristic information, and update the sound compensation value with a sound compensation value corresponding to the selected space information.

The electronic device may further include a memory configured to store a learning model configured to identify, based on characteristic information being input, a spatial characteristic corresponding to the input characteristic information, wherein the processor is configured to: confirm a spatial characteristic of a space where the electronic device is positioned using the extracted characteristic information and the learning model, and update the sound compensation value using a sound compensation value corresponding to the confirmed spatial characteristic.

The spatial characteristic may include at least one of: information regarding an installation state of the electronic device in the space, information regarding a distance between the electronic device and a wall, or information regarding a sound absorption level of the space.

The processor may be configured to: confirm the spatial characteristic of the space where the electronic device is positioned based on at least one of signal pattern information for a frequency domain of the extracted characteristic information or signal pattern information for a time domain.

The processor may be configured to: extract the characteristic information from the sound input to the microphone based on the audio signal corresponding to the content and a volume of the sound output from the audio output device.

The processor may be configured to: extract the characteristic information from the sound input to the microphone by applying at least one of an adaptive filter, an optimum filter, or blind audio source separation.

The electronic device may further include: a main body; and a display arranged in front of the main body and configured to display an image corresponding to the content.

According to an example embodiment of the disclosure, a method of controlling an electronic device includes: outputting, based on a content being selected, an audio signal corresponding to the content through an audio output device using a sound compensation value; extracting, based on a sound corresponding to the content being output from the audio output device and input to a microphone, characteristic information from the sound input to the microphone; calculating a sound compensation value based on the extracted characteristic information; and updating the sound compensation value with the calculated sound compensation value.

The method may further include: storing a plurality of space information and characteristic information of each of the plurality of space information, wherein in the updating, one of the plurality of space information is selected using the extracted characteristic information and the stored characteristic information, and the sound compensation value is updated with a sound compensation value corresponding to the selected space information.

The method may further include: storing a learning model configured to identify, based on characteristic information being input, a spatial characteristic corresponding to the input characteristic information, wherein in the calculating of the sound compensation value, a spatial characteristic of a space where the electronic device is positioned is confirmed using the extracted characteristic information and the learning model, and in the updating, the sound compensation value is updated using a sound compensation value corresponding to the confirmed spatial characteristic.

The spatial characteristic may include at least one of information regarding an installation state of the electronic device in the space, information regarding a distance between the electronic device and a wall, or information regarding a sound absorption level of the space.

In the confirming of the spatial characteristic, the spatial characteristic of the space where the electronic device is positioned may be confirmed based on at least one of signal pattern information for a frequency domain of the extracted characteristic information or signal pattern information for a time domain.

In the extracting of the characteristic information, the characteristic information may be extracted from the sound input to the microphone based on the audio signal corresponding to the content and a volume of the sound output from the audio output device.

In the extracting of the characteristic information, the characteristic information may be extracted from the sound input to the microphone by applying at least one of an adaptive filter, an optimum filter, or blind audio source separation.

Additional and/or other aspects and advantages of the disclosure will be set forth in part in the description which follows and, in part, will be apparent from the description, or may be learned by practice of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
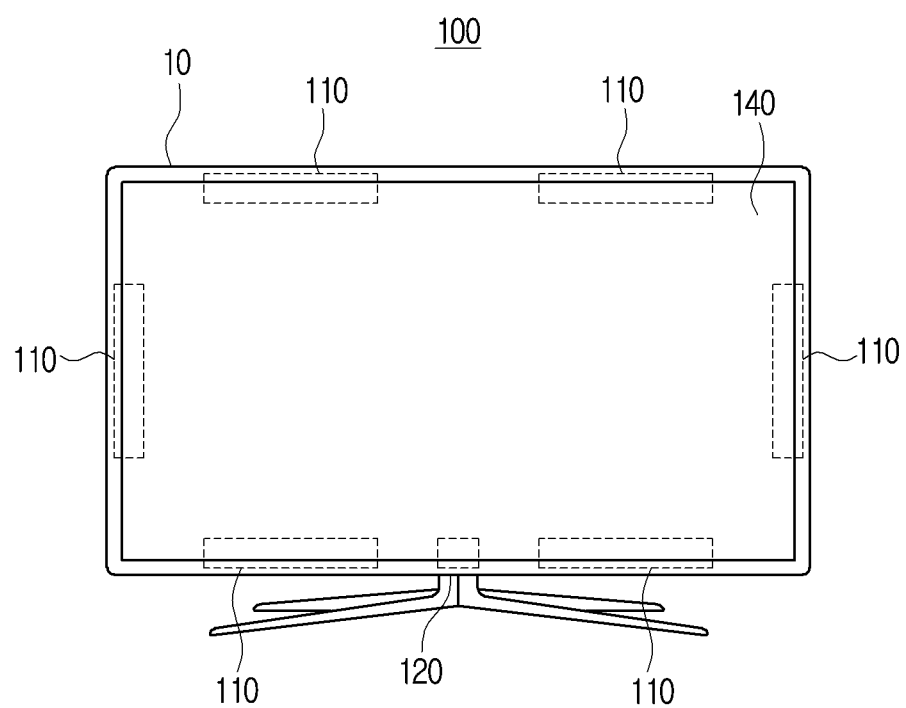
FIG. 1 is a diagram illustrating an example electronic device according to various embodiments.

Various example embodiments described below are illustratively provided to aid in understanding of the disclosure, and it is to be understood that the disclosure may be variously modified and executed and is not limited to the embodiments described herein. In case that it is considered that a detailed description of relevant known functions or components may obscure the gist of the disclosure, the detailed description and concrete illustration thereof may be omitted. Further, the accompanying drawings are not illustrated to scale, but sizes of some of components may be exaggerated to assist in the understanding of the disclosure.

As terms used in the disclosure and claims, general terms have been selected in consideration of functions in the disclosure. However, these terms may be changed with an intention of one skilled in the art, legal or technical interpretation, the emergence of new technology, and the like. In addition, some terms may be terms arbitrarily selected. These terms may be interpreted as having a meaning defined in the disclosure, and in case that the terms are not specifically defined, the terms may be interpreted based on general contents of the disclosure and a common technical knowledge in a corresponding technical field.

In the description of the disclosure, the order of each step should be understood in a non-limited manner unless a preceding step should be performed logically and temporally before a following step. That is, except for the exceptional cases as described above, even if a process described as a following step is preceded by a process described as a preceding step, it does not affect the nature of the disclosure, and the scope of rights should be defined regardless of the order of the steps.

In the disclosure, an expression "have", "may have", "include", "may include", or the like, indicates existence of a corresponding feature (for example, a numerical value, a function, an operation, or a component such as a part), and does not exclude existence of an additional feature.

Terms used in the disclosure, 'first', 'second', etc., may be used to describe various components, but the components are not to be interpreted to be limited to the terms. The terms are simply used to differentiate one element from another element. For example, the "first" component may be named the "second" component without being departed from the scope of the disclosure and the "second" component may also be similarly named the "first" component.

Further, the disclosure describes components necessary for describing each embodiment of the disclosure. Therefore, the disclosure is not necessarily limited to those components. Some components may be changed or omitted, and other components may be added. In addition, the components may also be distributed in different independent devices.

Furthermore, although various example embodiments of the disclosure will be described with reference to the accompanying drawings and contents described in the accompanying drawings, the disclosure is not limited by the embodiments.

Hereinafter, the disclosure will be described in greater detail with reference to the accompanying drawings.

FIG. 1 is a diagram illustrating an example electronic device according to various embodiments.

Referring to FIG. 1, an electronic device 100 according to an embodiment of the disclosure may include a main body 10, a display 140 arranged in front of the main body 10, an audio output device (e.g., including various audio output circuitry including, for example, a speaker) 110 embedded in the main body 10, and a microphone 120.

Although FIG. 1 illustrates an example in which the electronic device 100 is a display device, the disclosure is not limited thereto. The electronic device 100 may be implemented by various electronic devices having an audio output function, in addition to a device including a display, such as a television (TV), a smartphone, a table PC, a computer, or the like.

The audio output device 110 may include various audio output circuitry and is a component that may output various sounds, and may be implemented by a device such as a speaker. The audio output device 110 may output an audio signal provided by a content played by the electronic device 100. In an example in which the electronic device 100 is a display device, the audio output device 110 may output an audio signal corresponding to a content image displayed on the display 140.

The microphone 120 may include various circuitry and receive sound information output from the electronic device 100 and sound information generated around the electronic device 100. For example, the microphone 120 may receive a sound output from the audio output device 110. The microphone 120 may receive a sound that is degraded after being output from the audio output device 110 due to an influence of a surrounding space. The electronic device 100 may confirm a spatial characteristic by receiving the sound influenced by the surrounding space, and output the sound subjected to sound compensation optimized for the confirmed spatial characteristic. A detailed description thereof will be provided in greater detail below with reference to the drawings.

The audio output device 110 and the microphone 120 may be accommodated inside the main body 10 of the electronic device 100, and may be invisible or partially visible from the outside of the electronic device 100. Accordingly, the user may concentrate on an image displayed on the display 140 arranged at a front surface of the electronic device 100, and aesthetic impression may be improved.

Although a case that the audio output device 110 and the microphone 120 are accommodated inside the main body 10 has been described above, the positions at which the audio output device 110 and the microphone 120 are arranged are not limited thereto. For example, the audio output device 110 and the microphone 120 may be arranged outside the main body 10. Further, the audio output device 110 and the microphone 120 may also be implemented as devices separate from the main body 10. Further, the audio output device 110 and the microphone 120 may be mounted on a control device (a remote controller or the like).

Referring to FIG. 1, the electronic device 100 may include a plurality of audio output devices 110. In this case, the audio output devices 110 may output a plurality of channels such as a 2 channel, a 2.1 channel, a 3 channel, a 3.1 channel, a 5.1 channel, and a 7.1 channel, or the like, respectively. The audio output devices 110 may be arranged at opposite side portions, an upper portion, and a lower portion of the main body 10, and may output a sound in at least one of a forward direction in which the display 140 displays an image, a rearward direction opposite to the forward direction, a downward direction, an upward direction, or a sideward direction. However, the number of the audio output devices 110 and the positions at which the audio output devices 110 are arrange are not limited thereto, and the audio output devices 110 may be arranged at various positions on the main body 10.

Hereinafter, various components included in the electronic device 100 will be described in greater detail below with reference to FIGS. 2 and 3.

Figure 2:
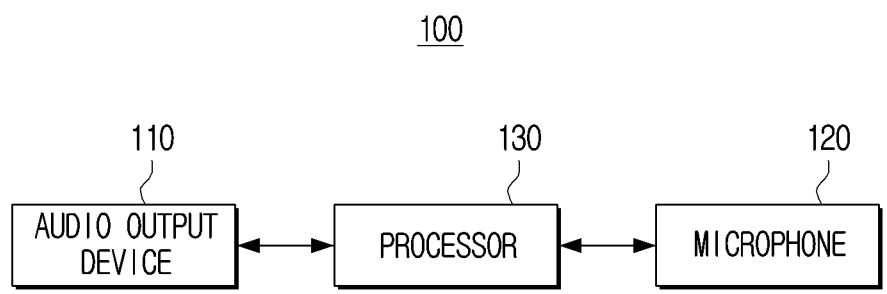
FIG. 2 is a block diagram illustrating an example configuration of the electronic device according to various embodiments.

FIG. 2 is a block diagram illustrating an example configuration of the electronic device according to various embodiments.

Referring to FIG. 2, the electronic device 100 may include the audio output device 110, the microphone 120, and a processor (e.g., including processing circuitry) 130.

The audio output device 110 and the microphone 120 have been described above with reference to FIG. 1, and thus, a detailed description thereof may not be repeated here.

The processor 130 may include various processing circuitry and be electrically coupled to the audio output device 110 and the microphone 120 and control an overall operation of the electronic device 100.

According to an embodiment of the disclosure, the processor 130 may be implemented by, for example, and without limitation, a digital signal processor (DSP) processing a digital signal, a microprocessor, a time controller (TCON), or the like. However, the disclosure is not limited thereto, and the processor 130 may include, for example, and without limitation, one or more of a central processing unit (CPU), a dedicated processor, a micro controller unit (MCU), a micro processing unit (MPU), a controller, an application processor (AP), a communication processor (CP), an ARM processor, an artificial intelligence (AI) processor, or the like, or may be defined by these terms. In addition, the processor 130 may be implemented by a system-on-chip (SoC) or large scale integration (LSI) in which a processing algorithm is embedded, or may be implemented in a field programmable gate array (FPGA) form. The processor 130 may perform various functions by executing computer executable instructions stored in a memory 150.

Once a content is selected, the processor 130 may control the audio output device 110 to output an audio signal corresponding to the content using a sound compensation value. Here, the sound compensation value may be a specified value or a value based on a value measured through the microphone 120.

The sound output from the audio output device 110 may be input to the microphone 120 included in the electronic device 100. The electric audio signal that is input to the microphone 120, recoded, and sampled is a signal including an audio characteristic of an audio signal component of a content being played, in addition to information related to a spatial characteristic to be required in the subsequent processing steps. Therefore, an operation of extracting characteristic information required to confirm a spatial characteristic of a space where the electronic device 100 is arranged needs to be performed.

Once the sound corresponding to the content is output from the audio output device 110 and input to the microphone 120, the processor 130 may extract characteristic information from the sound input to the microphone 120.

The characteristic information to be extracted may include a room impulse response (RIR) signal. In this case, the processor 130 may extract the characteristic information from the sound input to the microphone 120 by applying at least one of an adaptive filter, an optimum filter, a blind audio source separation (BASS), or the like that is representative in independent component analysis.

The processor 130 may perform the operation of extracting the characteristic information multiple times to generate finally determined characteristic information.

Further, the processor 130 may perform verification on the characteristic information extracted by each extraction operation, and discard characteristic information whose level of distortion deviates from a reference value or characteristic information whose correlation level compared between the extracted characteristic information deviates from a reference value. A detailed description thereof will be provided in greater detail below with reference to FIG. 5.

The processor 130 may calculate the sound compensation value based on the extracted characteristic information. The processor 130 may estimate an installation state of the electronic device 100 in the space based on the finally generated characteristic information. For example, in case that the electronic device 100 is a display device such as a TV, the processor 130 may estimate whether or not the electronic device 100 is in a wall-mounted state or in a table-mounted state based on the estimated RIR signal, and may confirm information regarding a distance between the electronic device 100 and the wall, or information regarding a sound absorption level of the space where the electronic device is installed. A detailed description thereof will be provided in greater detail below with reference to FIGS. 6, 7, 8, 9, 10 and 11.

The processor 130 may calculate the sound compensation value for performing sound compensation based on the confirmed spatial characteristic using a method optimized for the corresponding space. The spatial characteristic may include at least one of information regarding the installation state of the electronic device 100 in the space, the information regarding the distance between the electronic device 100 and the wall, or the information regarding the sound absorption level of the space.

For example, in case that the electronic device 100 is in the wall-mounted state in which a booming phenomenon in which a volume in a frequency band becomes unnecessarily large easily occurs, or in the table-mounted state in which the electronic device 100 and the wall are close to each other, the sound compensation value for performing low-frequency band frequency characteristic smoothing processing to suppress the booming phenomenon from occurring may be calculated. In a case that the spatial characteristic that the sound absorption level is high is confirmed, the sound compensation value for performing frequency characteristic smoothing processing and harmonic enhancer processing for improving a level of middle and high frequency bands to increase clearness of the sound may be calculated.

The processor 130 may update the sound compensation value applied to the content with the calculated sound compensation value. For example, the sound output from the audio output device 110 may be corrected by reflecting the characteristic of the space where the electronic device 100 is arranged in real time, and even in case that the spatial characteristic of the space where the electronic device 100 is arranged is changed, characteristic information of the sound input to the microphone 120 may be extracted and the operation of updating the sound compensation value may be periodically performed to perform sound compensation automatically reflecting the changed spatial characteristic.

Accordingly, the sound compensation may be automatically performed without an additional manual operation of the user, and the sound compensation operation is performed using the audio of the content generally played in the electronic device 100, thereby improving convenience of the user.

Figure 3:
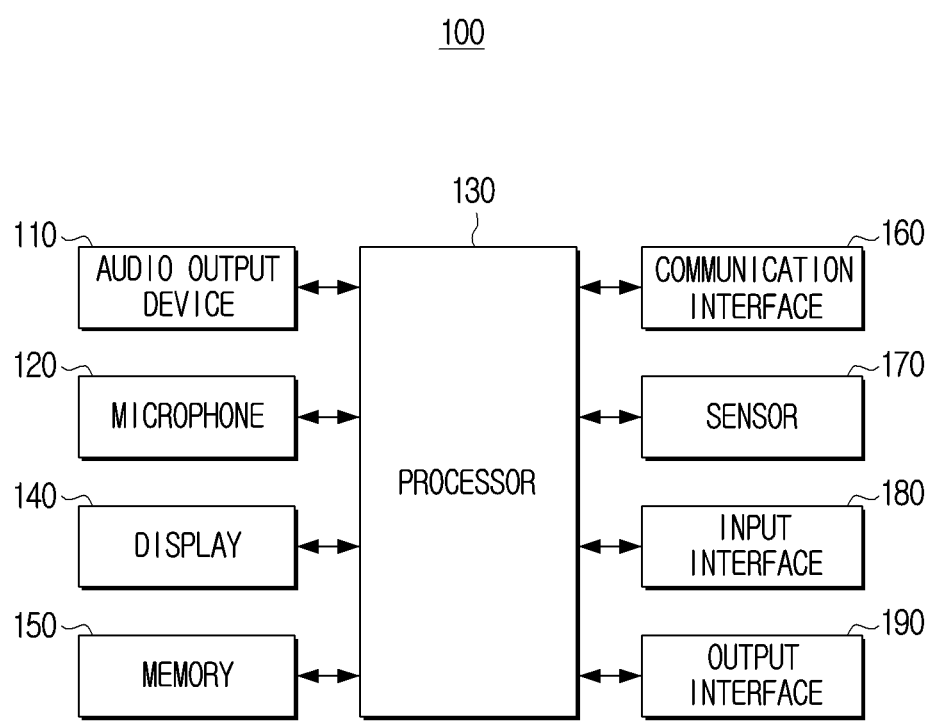
FIG. 3 is a block diagram illustrating an example configuration of the electronic device according to various embodiments.

FIG. 3 is a block diagram illustrating an example configuration of the electronic device according to various embodiments.

Referring to FIG. 3, the electronic device 100 may include the audio output device 110, the microphone 120, the processor 130, the display 140, the memory 150, a communication interface (e.g., including communication circuitry) 160, a sensor 170, an input interface (e.g., including input circuitry) 180, and an output interface (e.g., including output circuitry) 190. A detailed description of the components illustrated in FIG. 3 overlapping with those illustrated in FIG. 2 may not be repeated here.

The display 140 is a component for displaying an image of a content, and may be implemented in various forms such as a liquid crystal display (LCD), an organic light emitting diode (OLED), liquid crystal on silicon (LCoS), digital light processing (DLP), and a quantum dot (QD) display panel.

The electronic device 100 may display various contents on the display 140. For example, the content may include at least one of a still image or a moving image.

The memory 150 may be electrically coupled to the processor 130, and may store data necessary for various embodiments of the disclosure.

According to an embodiment of the disclosure, the memory 150 may store a plurality of space information and characteristic information of each of the plurality of space information. The processor 130 may select one of the plurality of space information using the characteristic information extracted from the sound input to the microphone 120 and the characteristic information stored in the memory 150, and update the sound compensation value applied to the content with the sound compensation value corresponding to the selected space information.

Once the characteristic information is input, the memory 150 may store a learning model that identifies the space information corresponding thereto. The processor 130 may confirm the spatial characteristic of the space where the electronic device 100 is positioned using the characteristic information extracted from the sound input to the microphone 120 and the learning model stored in the memory 150, and update the sound compensation value applied to the content with the sound compensation value corresponding to the confirmed spatial characteristic.

The memory 150 may be implemented in a form of a memory embedded in the electronic device 100 or in a form of a memory attachable to and detachable from the electronic device 100, depending on a data storing purpose. For example, data for driving the electronic device 100 may be stored in the memory embedded in the electronic device 100, and data for an extension function of the electronic device 100 may be stored in the memory attachable to and detachable from the electronic device 100. Meanwhile, the memory embedded in the electronic device 100 may be implemented by at least one of a volatile memory (for example, a dynamic RAM (DRAM), a static RAM (SRAM), or a synchronous dynamic RAM (SDRAM)), a non-volatile memory (for example, a one time programmable ROM (OTPROM), a programmable ROM (PROM), an erasable and programmable ROM (EPROM), an electrically erasable programmable ROM (EEPROM), a mask ROM, a flash ROM, a flash memory (for example, a NAND flash or a NOR flash), a hard drive, or a solid state drive (SSD), and the memory attachable to and detachable from the electronic device 100 may be implemented by a memory card (for example, a compact flash (CF), a secure digital (SD), a micro secure digital (Micro-SD), a mini secure digital (Mini-SD), an extreme digital (xD), or a multi-media card (MMC)), an external memory (for example, a USB memory) connectable to a USB port, or the like.

The communication interface 160 may include various communication circuitry and be coupled to another external device through a network in various communication manners. Accordingly, the communication interface 160 may transmit and receive various data to and from another external device.

The communication interface 160 including the various communication circuitry may refer to hardware that may perform wired or wireless communication with various external devices to transmit and receive various information (or data). The communication interface 160 may transmit and receive various information to and from various external devices using communication protocols such as a transmission control protocol/internet protocol (TCP/IP), a user datagram protocol (UDP), a hyper text transfer protocol (HTTP), a secure hyper text transfer protocol (HTTPS), a file transfer protocol (FTP), a secure file transfer protocol (SFTP), and message queuing telemetry transport (MQTT).

The sensor 170 may refer to an element that senses an intensity or change of various physical signals (for example, temperature, light, sound, chemicals, electricity, magnetism, and pressure). The sensed signal may be converted into data in a format interpretable by the processor 130. The sensor 170 may be implemented by various sensors such as a proximity sensor, a luminance sensor, a motion sensor, a Time-of-Flight (ToF) sensor, and a GPS sensor.

The input interface 180 may include various input circuitry and may be a component for receiving various user instructions and information. The processor 130 may perform a function corresponding to the user instruction input through the input interface 180, or may store information input through the input interface 180 in the memory 150. The input interface 180 may include the microphone 120 to receive the user instruction in a form of speech, or may be implemented by a display (touch screen) for receiving the user instruction in a form of touch.

The output interface 190 may include various output circuitry including at least one of a display or a speaker. The display may include a device that outputs information in a visual form (for example, a text or an image). The display may display an image frame in an entire display region or a part of the display region. The display region may refer to an entire region in a pixel unit in which information or data is visually displayed. The speaker may include a device that outputs information in an auditory form (for example, a sound). The speaker may output various alarm sounds or voice messages, in addition to various audio data subjected to various processing such as decoding, amplification, and noise filtering by an audio processor.

Figure 4:
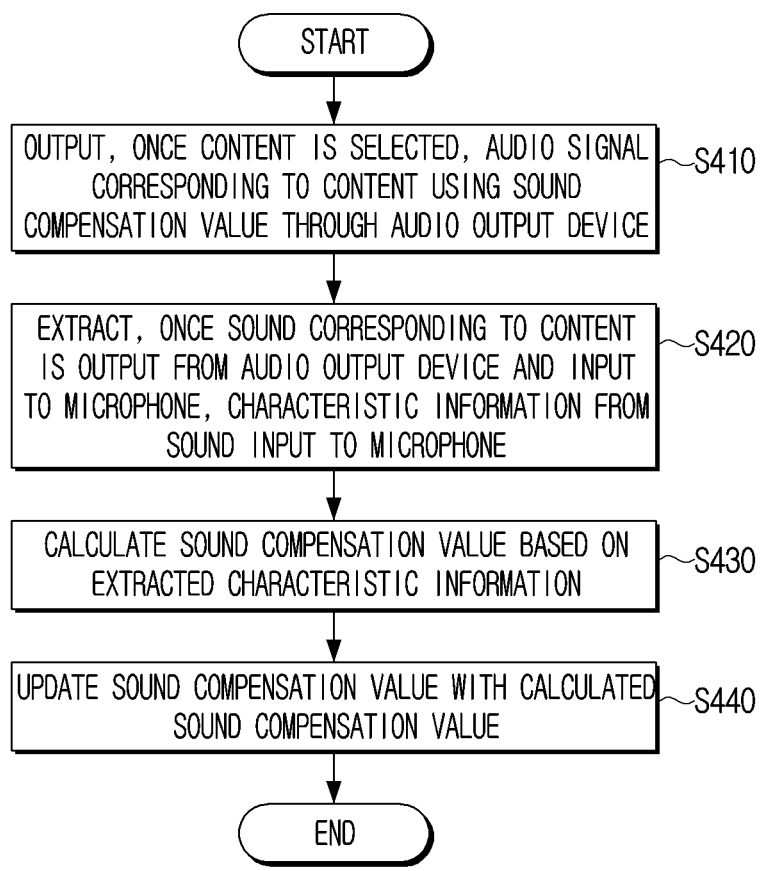
FIG. 4 is a flowchart illustrating an example method of controlling the electronic device according to various embodiments.

FIG. 4 is a flowchart illustrating an example method of controlling the electronic device according to various embodiments.

Once a content is selected, the electronic device 100 may output, through the audio output device, an audio signal corresponding to the content using the sound compensation value (S410).

Once the sound corresponding to the content is output from the audio output device and input to the microphone, the electronic device 100 may extract characteristic information from the sound input to the microphone (S420).

The electronic device 100 may calculate the sound compensation value based on the extracted characteristic information (S430).

The electronic device 100 may store a plurality of space information and characteristic information of each of the plurality of space information. The electronic device 100 may select one of the plurality of space information using the extracted characteristic information and the stored characteristic information, and update the sound compensation value with the sound compensation value corresponding to the selected space information.

Further, once the characteristic information is input, the electronic device 100 may store the learning model that identifies the space information corresponding thereto in advance. In this case, the electronic device 100 may confirm the spatial characteristic of the space where the electronic device 100 is positioned using the extracted characteristic information and the learning model stored in advance.

The spatial characteristic may include, for example, at least one of the information regarding the installation state of the electronic device in the space, the information regarding the distance between the electronic device and the wall, or the information regarding the sound absorption level of the space.

The electronic device 100 may confirm the spatial characteristic of the space where the electronic device is positioned based on at least one of signal pattern information for a frequency domain of the extracted characteristic information or signal pattern information for a time domain. A detailed description thereof will be provided in greater detail below with reference to FIGS. 6, 7, 8, 9, 10 and 11.

The electronic device 100 may update the sound compensation value with the calculated sound compensation value (S440).

In this case, the electronic device 100 may update the sound compensation value using the sound compensation value corresponding to the spatial characteristic confirmed using the learning model stored in advance.

Figure 5:
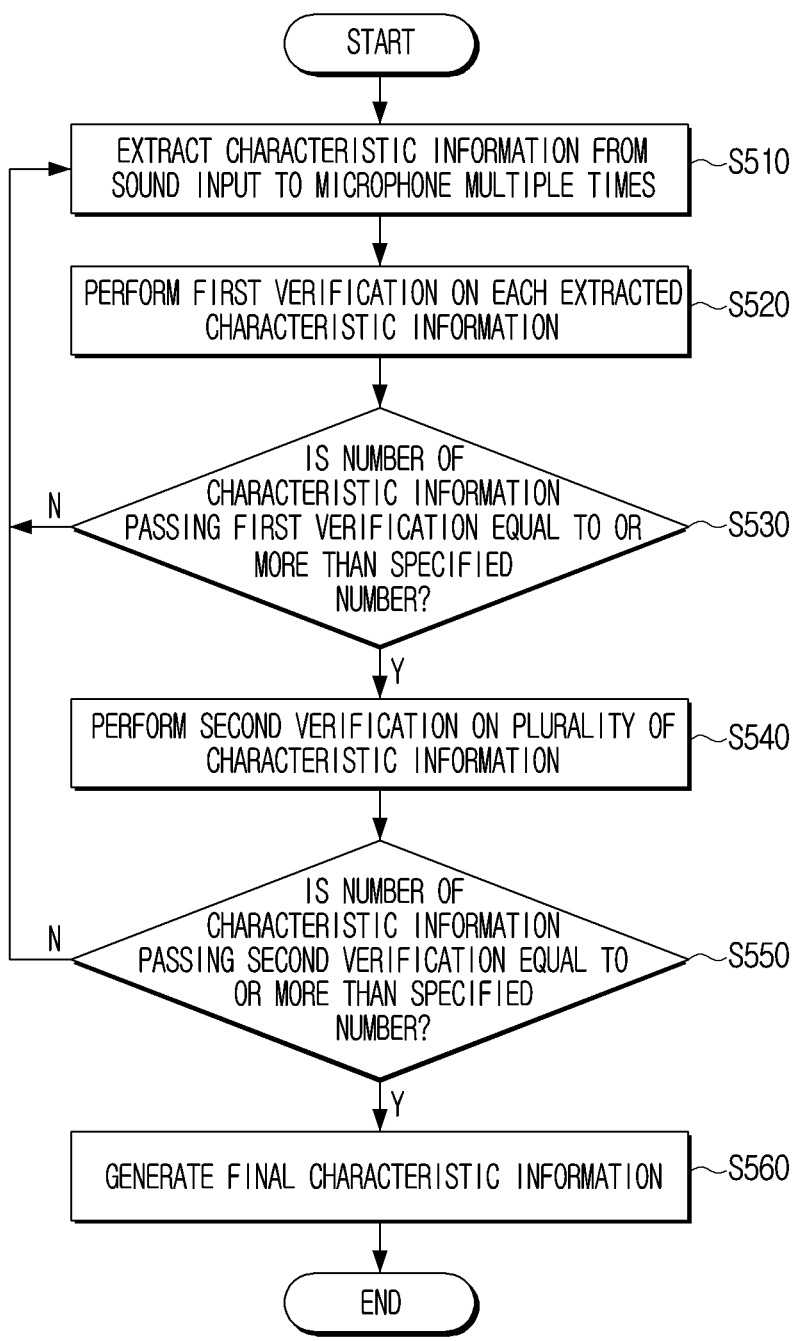
FIG. 5 is a flowchart illustrating an example operation of the electronic device in which characteristic information is extracted from a sound input to a microphone according to various embodiments.

FIG. 5 is a flowchart illustrating an example operation of the electronic device in which the characteristic information is extracted from the sound input to the microphone according to various embodiments.

The electronic device 100 may perform a signal extraction operation of extracting the characteristic information including information for confirming the spatial characteristic from the sound input to the microphone 120 to generate final characteristic information (for example, estimated RIR signal), and a verification operation for the extracted signal. Accordingly, it is possible to improve accuracy of the characteristic information estimated from the sound input to the microphone 120.

Referring to FIG. 5, the electronic device 100 may extract the characteristic information from the sound input to the microphone 120 multiple times (S510), and perform first verification on each extracted characteristic information (S520).

For example, the electronic device 100 may confirm a generation timing of a direct sound of the characteristic information extracted through the first verification (S530), that is, the extracted RIR signal, and compensate a sample-delay for each signal to determine a distortion level of each time domain section, and may discard the corresponding characteristic information in case that the distortion level deviates from a reference value. In case that it is determined that the number of characteristic information passing such verification is equal to or more than a specified number (S530-Y), the corresponding characteristic information may be temporarily stored in the memory 150.

The electronic device 100 may perform second verification for the plurality of stored characteristic information (S540).

For example, the electronic device 100 may compare sample-delay levels of the plurality of characteristic information, discard the characteristic information deviating from the reference value, perform frequency-conversion on the RIR signals of the remaining characteristic information, compare the correlation levels, and discard the characteristic information for the signal deviating from the reference value (S550). In case that it is determined that the number of characteristic information passing such verification is equal to or more than a specified number (S550-Y), a statistical representative value thereof may be generated as final characteristic information (S560).

In this case, the electronic device 100 may confirm the spatial characteristic using the finally generated characteristic information and calculate the sound compensation value corresponding thereto.

Figure 6:
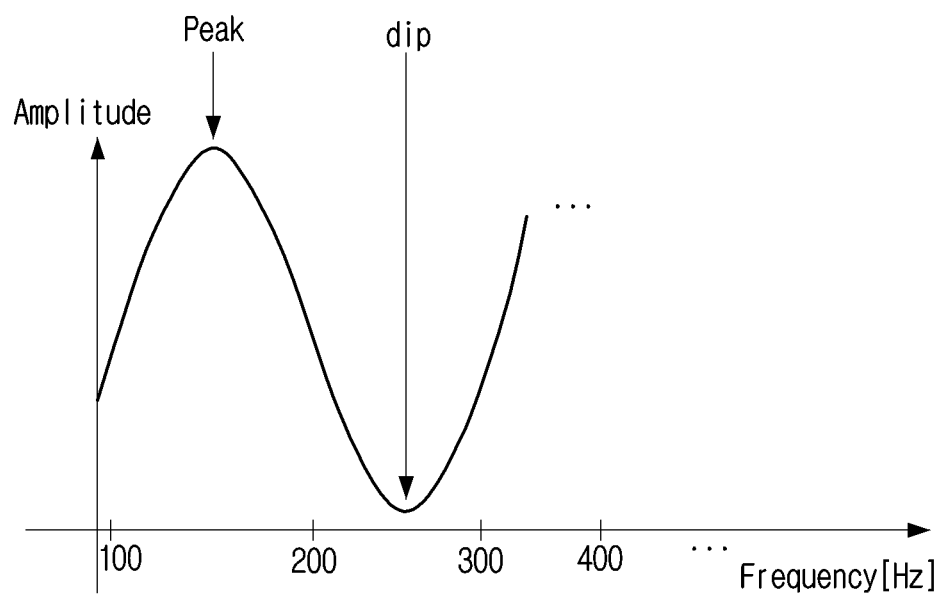
FIG. 6 is a graph analyzing a signal pattern for a frequency domain of the extracted characteristic information to confirm a spatial characteristic of a space where the electronic device is positioned according to various embodiments.
Figure 7:
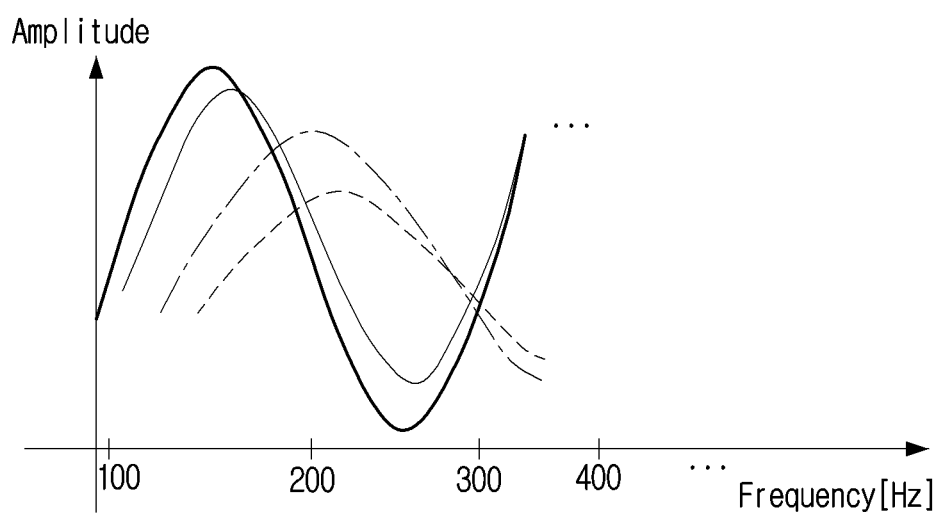
FIG. 7 is a graph analyzing a signal pattern for the frequency domain of the extracted characteristic information to confirm a spatial characteristic of the space where the electronic device is positioned according to various embodiments.

FIGS. 6 and 7 are graphs illustrating examples of analyzing a signal pattern for the frequency domain of the extracted characteristic information to confirm the spatial characteristic of the space where the electronic device is positioned according to various embodiments.

FIG. 6 illustrates an example of a signal pattern for the frequency domain of the RIR signal of the characteristic information extracted from the sound input to the microphone 120 and finally generated, and FIG. 7 illustrates a signal pattern for the frequency domain of the characteristic information appearing in a plurality of spaces having different spatial characteristics.

For example, in case that the electronic device 100 is a TV, and the TV is installed in the space, reinforcement and offsetting of a sound pressure may vary in the space where the TV is installed depending on a condition such as a distance between the TV and the wall or the presence or absence of a table on which the TV is mounted.

According to an embodiment of the disclosure, in consideration of the fact that one microphone for measuring an acoustic characteristic of the space where the TV is installed is embedded in the TV (that is, positions of a sound source and a sound pressure measurement point match each other), a frequency characteristic (power spectrum) of each estimated RIR signal may have characteristics of a power spectral envelope having a characteristic peak and dip for each spatial characteristic within a band range of about 100 to 400 Hz. For example, characteristics such as a frequency band in which the peak appears, a frequency band in which the dip appears, and a power level at which the peak and the dip appear may vary depending on the spatial characteristic.

Characteristic data obtained by measuring a correlation between the conditions at the time of installing the TV and the characteristics of the power spectral envelope appearing within the band range of 100 to 400 Hz for each spatial characteristic, or a compensation between low-frequency band frequency characteristics obtained through a simulation may be approximated or mapped to a function parameter to perform modeling using a statistical technique such as approximation to a cubic parametric function, a regression function, or clustering, thereby matching the frequency characteristic and the spatial characteristic of the estimated RIR signal.

Further, such a power spectral envelope pattern may also be analyzed using machine learning such as a decision tree or a support vector machine or deep learning representative by a deep neural network based on various actual measurement data.

Figure 8:
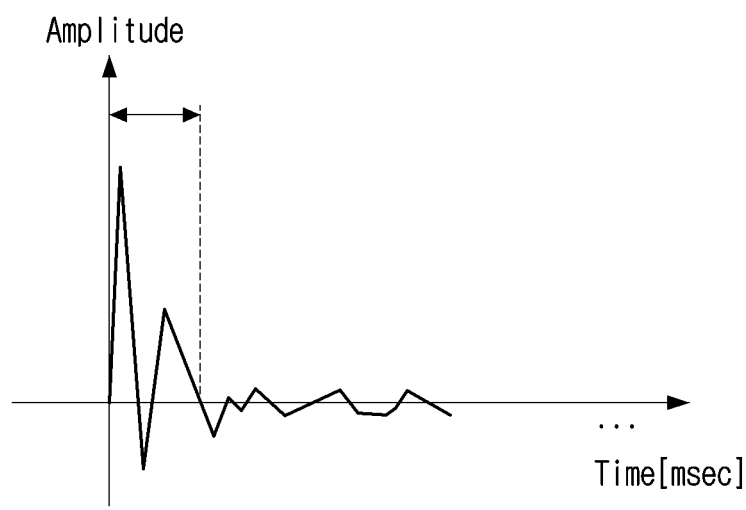
FIG. 8 is a graph analyzing a signal pattern for a time domain of the extracted characteristic information to confirm a spatial characteristic of the space where the electronic device is positioned according to various embodiments.
Figure 9:
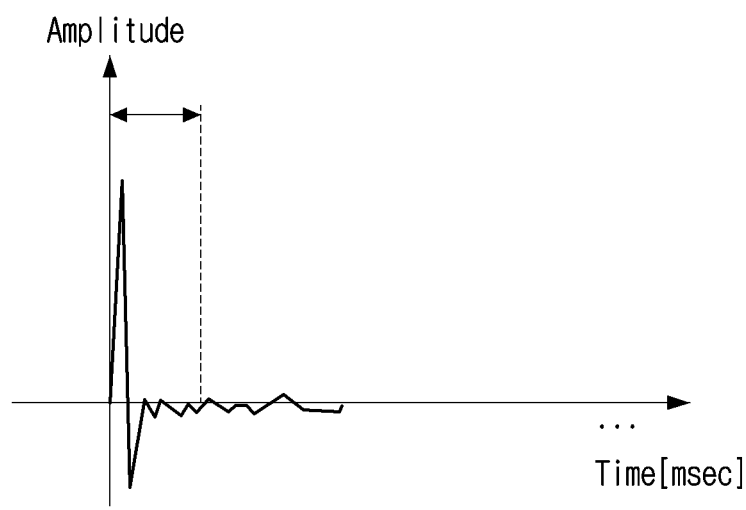
FIG. 9 is a graph analyzing a signal pattern for the time domain of the extracted characteristic information to confirm a spatial characteristic of the space where the electronic device is positioned according to various embodiments.

FIGS. 8 and 9 are graphs illustrating examples of analyzing a signal pattern for the time domain of the extracted characteristic information to confirm the spatial characteristic of the space where the electronic device is positioned according various embodiments.

An operation of performing analysis based on a time domain pattern of the RIR signal may be performed together to increase an accuracy in estimating the TV installation state in the space.

Referring to FIG. 8, it may be appreciated that a reflection component is present in a specific section in a time domain pattern of the extracted characteristic information. On the other hand, referring to FIG. 9, it may be appreciated that the reflection component is observed in the same section. As such, the spatial characteristic may be confirmed by analyzing the signal pattern for the time domain.

Figure 10:
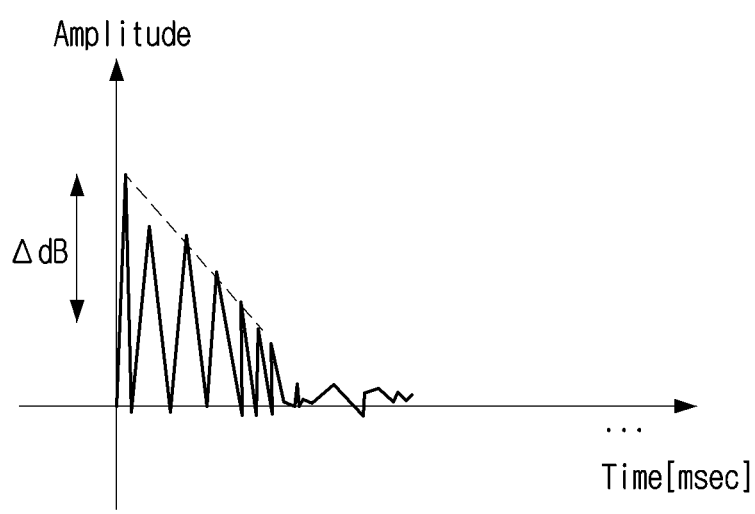
FIG. 10 is a graph analyzing a reverberation time of the signal pattern for the time domain of the extracted characteristic information to confirm a spatial characteristic of the space where the electronic device is positioned according to various embodiments.
Figure 11:
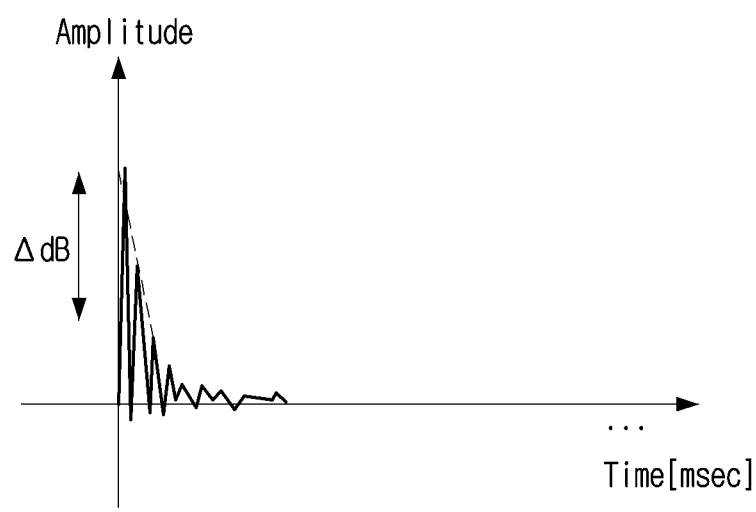
FIG. 11 is a graph analyzing a reverberation time of the signal pattern for the time domain of the extracted characteristic information to confirm a spatial characteristic of the space where the electronic device is positioned according to various embodiments.

FIGS. 10 and 11 are graphs illustrating examples of analyzing a reverberation time of the signal pattern for the time domain of the extracted characteristic information to confirm the spatial characteristic of the space where the electronic device is positioned according to various embodiments.

The reverberation time may be a characteristic value that may be used for the purpose of checking how sound waves are reflected within a space in case that the sound waves are radiated in the space. For example, a time interval until a signal amplitude level attenuates to a certain level based on an amplitude of a direct sound (a component whose amplitude is greatest in a signal pattern) appearing in a signal pattern for a time domain of an impulse response (IR) signal may be determined as the reverberation time of the corresponding space. The electronic device 100 may estimate the sound absorption level of the space based on the reverberation time. In case of a space having a high sound absorption level, a phenomenon that clearness of a sound that the user generally listens deteriorates occurs, and thus, the electronic device 100 may calculate the sound compensation value that may be used to compensate the clearness.

While the disclosure has been illustrated and described with reference to various example embodiments, it will be understood that the disclosure is not limited to the above-mentioned embodiments, and may be variously modified by those skilled in the art to which the disclosure pertains without departing from the scope of the disclosure including the accompanying claims. These modifications should also be understood to fall within the scope and spirit of the disclosure.

What is claimed is:

1. An electronic device comprising:
   an audio output device comprising circuitry configured to output a sound;
   a microphone;
   a memory configured to store a plurality of space information and characteristic information of each of the plurality of space information; and a processor configured to control, based on a content being selected, the audio output device to output an audio signal corresponding to the content using a first sound compensation value, wherein the processor is configured to:

extract, based on a sound corresponding to the content being output from the audio output device and input to the microphone, characteristic information from the sound input to the microphone, select one of the plurality of space information using the characteristic information extracted from the sound input to the microphone and the characteristic information stored in the memory, calculate a second sound compensation value based on the selected space information, and update the first sound compensation value with the second sound compensation value.

2. The electronic device as claimed in claim 1, further comprising: a memory configured to store a learning model configured to identify, based on characteristic information being input, a spatial characteristic corresponding to the input characteristic information, wherein the processor is configured to: confirm a spatial characteristic of a space where the electronic device is positioned using the extracted characteristic information and the learning model, calculate the second sound compensation value further based on the confirmed spatial characteristic, and update the first sound compensation value using the second sound compensation value corresponding to the confirmed spatial characteristic.

3. The electronic device as claimed in claim 2, wherein the spatial characteristic includes at least one of: information regarding an installation state of the electronic device in the space, information regarding a distance between the electronic device and a wall, or information regarding a sound absorption level of the space.

4. The electronic device as claimed in claim 2, wherein the processor is configured to: confirm the spatial characteristic of the space where the electronic device is positioned based on at least one of: signal pattern information for a frequency domain of the extracted characteristic information or signal pattern information for a time domain.

5. The electronic device as claimed in claim 1, wherein the processor is configured to: extract the characteristic information from the sound input to the microphone based on the audio signal corresponding to the content and a volume of the sound output from the audio output device.

6. The electronic device as claimed in claim 1, wherein the processor is configured to: extract the characteristic information from the sound input to the microphone by applying at least one of: an adaptive filter, an optimum filter, or blind audio source separation.

7. The electronic device as claimed in claim 1, further comprising:
    a main body; and
    a display arranged in front of the main body and configured to display an image corresponding to the content.

8. A method of controlling an electronic device, comprising:
    storing a plurality of space information and characteristic information of each of the plurality of space information;
    outputting, based on a content being selected, an audio signal corresponding to the content through an audio output device using a sound compensation value;
    extracting, based on a sound corresponding to the content being output from the audio output device and input to a microphone, characteristic information from the sound input to the microphone;
    selecting one of the plurality of space information using the characteristic information extracted from the sound input to the microphone and the characteristic information;
    calculating the second sound compensation value based on the selected space information; and
    updating the first sound compensation value with the second sound compensation value.

9. The method as claimed in claim 8, further comprising storing a learning model configured to identify, based on characteristic information being input, a spatial characteristic corresponding to the input characteristic information, wherein in the calculating of the second sound compensation value, a spatial characteristic of a space where the electronic device is positioned is confirmed using the extracted characteristic information and the learning model, calculating the second sound compensation value further based on the confirmed spatial characteristic, and updating the first sound compensation value using a second sound compensation value corresponding to the confirmed spatial characteristic.

10. The method as claimed in claim 9, wherein the spatial characteristic includes at least one of: information regarding an installation state of the electronic device in the space, information regarding a distance between the electronic device and a wall, or information regarding a sound absorption level of the space.

11. The method as claimed in claim 9, wherein in the confirming of the spatial characteristic, the spatial characteristic of the space where the electronic device is positioned is confirmed based on at least one of: signal pattern information for a frequency domain of the extracted characteristic information or signal pattern information for a time domain.

12. The method as claimed in claim 8, wherein in the extracting of the characteristic information, the characteristic information is extracted from the sound input to the microphone based on the audio signal corresponding to the content and a volume of the sound output from the audio output device.

13. The method as claimed in claim 8, wherein in the extracting of the characteristic information, the characteristic information is extracted from the sound input to the microphone by applying at least one of: an adaptive filter, an optimum filter, or blind audio source separation.

* * * * *